United States Patent
Morimoto (10) Patent No.: US 7,508,782 B2
(45) Date of Patent: Mar. 24, 2009

(54) POWER SAVING DIVERSITY MODE WIRELESS LAN MOBILE COMMUNICATION DEVICE

(75) Inventor: Shinichi Morimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 698 days.

(21) Appl. No.: 11/067,912

(22) Filed: Feb. 28, 2005

(65) Prior Publication Data

US 2005/0190711 A1 Sep. 1, 2005

(30) Foreign Application Priority Data

Feb. 26, 2004 (JP) ............................. 2004-051760

(51) Int. Cl.
*H04Q 7/00* (2006.01)
(52) U.S. Cl. ...................... 370/311; 370/466; 455/572; 455/574
(58) Field of Classification Search ................ 370/311, 370/466; 455/572, 574
See application file for complete search history.

(56) References Cited

U.S. PATENT DOCUMENTS 7,092,710 B1 * 8/2006 Stoter et al. ................. 455/437

| 2003/0016178 | A1 * | 1/2003 | Byun et al. | 343/702 |
| 2006/0073827 | A1 * | 4/2006 | Vaisanen et al. | 455/436 |
| 2006/0079232 | A1 * | 4/2006 | Omori et al. | 455/436 |

FOREIGN PATENT DOCUMENTS

| CN | 1125366 A | 6/1996 |
| JP | 8-107381 A | 4/1996 |
| JP | 2000-013393 A | 1/2000 |

* cited by examiner

*Primary Examiner*—Alexander Eisen
*Assistant Examiner*—Julio R Perez
(74) *Attorney, Agent, or Firm*—Dickstein Shapiro LLP

(57) ABSTRACT

A wireless mobile communication device comprises first and second wireless interfaces that are individually powered from a battery. A controller sets the first wireless interface in a power-ON state for establishing a first wireless link with a first base station, makes a determination whether a handover is necessary from the first base station to a second base station, sets the second wireless interface in a power-ON state in response to the determination that the handover is necessary for making a search for the second base station, and sets the first wireless interface in a power-OFF state when the second wireless interface has established a second wireless link with the second base station. A wireless LAN module is connected to the controller for establishing a session with a remote communication device via the first and second wireless links.

12 Claims, 7 Drawing Sheets

POWER SAVING DIVERSITY MODE WIRELESS LAN MOBILE COMMUNICATION DEVICE

BACKGROUND OF THE INVENTION

1. Field of the Invention

The present invention relates to a power saving diversity mode wireless LAN mobile communication device.

2. Description of the Related Art

A communication system using diversity mode wireless LAN terminals is shown and described in Japanese Patent Publication P2000-13393A. In this prior art system, a wired LAN terminal and a wireless LAN terminal. Each terminal is provided with a pair of diversity antenna systems to establish a wireless link The wired LAN terminal is an access point of the wireless LAN terminal to a LAN cable. A desktop computer is connected to the wireless LAN terminal. One of the wireless links is used as a working transmission system and the other as a spare or backup transmission system. When the working transmission system fails to meet a specified bit error rate, protection switching occurs between the working and backup systems. Since the wireless LAN terminal is a fixed terminal, the backup system is constantly warmed up by the mains power supply in readiness for protection switching. However, a substantial amount of power is dissipated when the spare unit is being warmed up.

In the case of a wireless LAN cellular mobile terminal that establishes a session with a remote terminal using a wireless link to a base station, it is necessary to periodically perform handover from one base station to the next when the session proceeds as the terminal is on a vehicle travelling at high speed. To ensure against interruptions, the diversity method is advantageous for the wireless LAN cellular mobile terminal since it allows one of the transmission systems to operate for establishing a session with a base station and allows the other transmission system to operate for making a search for the next base station while the session proceeds. However, due to the limited battery power, the diversity mode wireless LAN cellular mobile terminal would encounter difficulty in continuing a session for an extended period of time.

A power saving diversity mode wireless communication device is disclosed in Japanese Patent Publication 1996-107381. According to the prior art, a plurality of wireless interfaces are set in a power-ON state and one of the wireless interfaces is selected to establish a channel with a remote terminal and the quality of the channel is monitored. When the monitored quality of the channel is higher than a threshold value, the other wireless interfaces are set in a power-OFF state. If the quality of the channel drops below the threshold value, the other wireless interfaces are set in a power-ON state and the same process is repeated.

SUMMARY OF THE INVENTION

It is therefore an object of the present invention to provide a power saving diversity mode wireless LAN mobile communication device which eliminates the need to warm-up wireless interfaces.

According to a first aspect of the present invention, there is provided a wireless mobile communication device comprising a battery, first and second antennas, first and second wireless interfaces operable with the antennas, the first and second wireless interfaces being arranged to be individually powered from the battery, a controller for setting the first wireless interface in a power-ON state for establishing a first wireless link with a first base station, making a determination whether a handover is necessary from the first base station to a second base station, setting the second wireless interface in a power-ON state in response to the determination that the handover is necessary for making a search for the second base station, and setting the first wireless interface in a power-OFF state when the second wireless interface has established a second wireless link with the second base station, and a wireless LAN module connected to the controller for establishing a session with a remote communication device via the first and second wireless links.

According to a second aspect, the present invention provides a power saving method for a wireless mobile communication device, wherein the device comprises a battery, first and second antennas, first and second wireless interfaces operable with the antennas, and a wireless LAN module for establishing a session with a remote communication device via wireless links established by the first and second wireless interfaces, wherein the first and second wireless interfaces are arranged to be individually powered from the battery, the method comprising the steps of (a) setting the first wireless interface in a power-ON state for establishing a first wireless link with a first base station, (b) making a determination whether a handover is necessary from the first base station to a second base station, (c) setting the second wireless interface in a power-ON state in response to the determination that the handover is necessary and making a search for the second base station, and (d) setting the first wireless interface in a power-OFF state when the second wireless interface has established a second wireless link with the second base station.

When the mobile terminal continues the established session, the method further includes the steps of (e) making a determination whether a handover is necessary from the second base station to a third base station, (f) setting the first wireless interface in a power-ON state in response to the determination that the handover is necessary and making a search for the third base station, and (g) setting the second wireless interface in a power-OFF state when the first wireless interface has established a third wireless link with the third base station.

BRIEF DESCRIPTION OF THE DRAWINGS

The present invention will be described in detail further with reference to the following drawings, in which.

DETAILED DESCRIPTION

Figure 1:
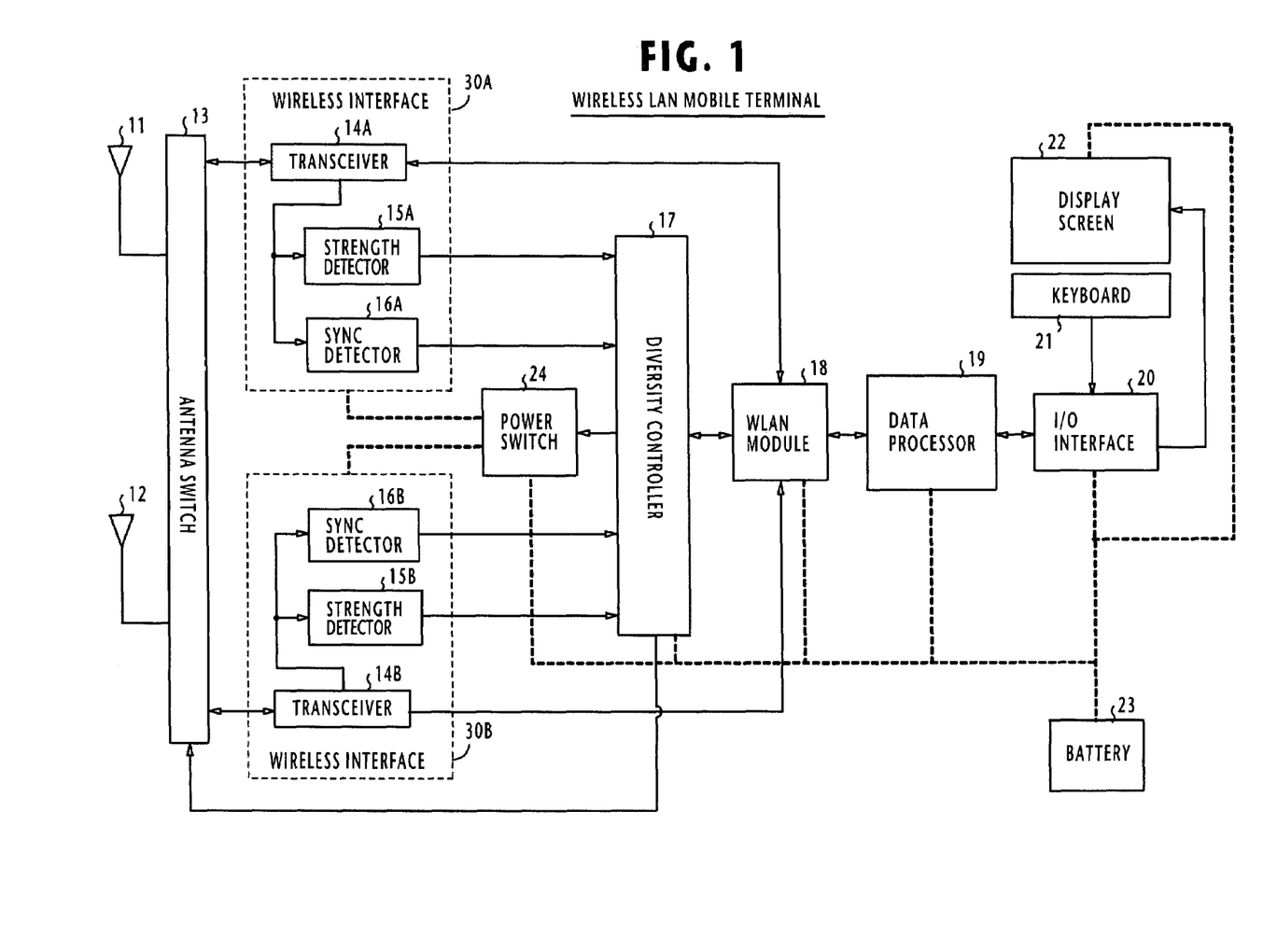
FIG. 1 is a block diagram of a power saving diversity mode wireless LAN mobile terminal of the present invention.

Referring now to FIG. 1, there is shown a wireless LAN mobile communication device of the present invention. The communication device is implemented with a notebook computer provided with a pair of antennas 11 and 12. The antennas 11 and 12 are connected to an antenna switch 13 that selectively establishes a connection to wireless interfaces 30A and 30B under the control of a diversity controller 17, to which a wireless LAN module 18 is connected. Wireless LAN module 18 is designed according to the IEEE 802.11.

Each of the wireless interfaces 30A, 30B comprises a wireless transceiver 14, a field strength detector 15 and a sync detector 16. In each wireless interface, the field strength detector 15 is connected to the transceiver 14 to produce an output representing the field strength of a signal transmitted from a base station, and the sync detector 16 is also connected to the transceiver to produce an output indicating that the mobile terminal is synchronized to a base station.

Diversity controller 17 initially sets one of the wireless interfaces 30A and 30B in a power-ON state by supplying a DC voltage through a power switch 24 from a rechargeable battery 23 and establishes a connection to a base station. Once a connection is established, the diversity controller 17 directs the wireless LAN module 18 to begin a session with a remote data terminal using the active wireless transceiver 14. WLAN module 18 is connected to a data processor 19 which is, in turn, connected to an I/O interface 20 to which the keyboard 21 and the display screen 22 of the notebook computer are connected. All circuit elements of the mobile terminal are connected through power lines (as indicated by thick dotted lines) to the rechargeable battery 23.

While the session proceeds, the diversity controller 17 monitors the output of the field strength detector 15 of the active wireless interface and determines whether or not a cell search is required for a handover to a new base station so that continuity is guaranteed for the session. If this is the case, the diversity controller sets the other wireless interface in a power-ON state and initiates a search for a new base station so that both wireless interfaces operate simultaneously for a brief period of time while the session with the old base station is nearing its end.

Details of the operation of the diversity controller 17 will be described below with reference to the flowcharts of FIGS. 2 and 3.

Figure 2:
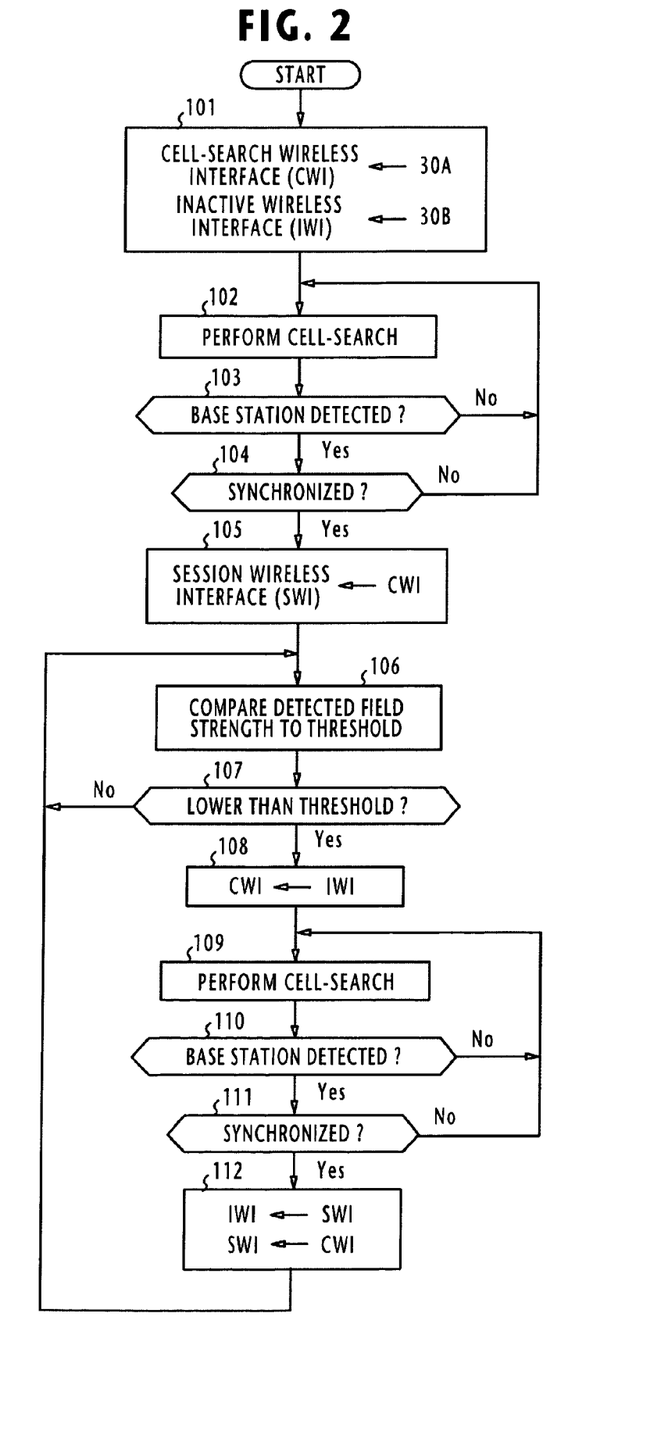
FIG. 2 is a flowchart of the operation of the diversity controller of FIG. 1 according to a first embodiment of the invention.

In FIG. 2, at step 101, the diversity controller 17 sets the wireless interface 30A in a power-ON state and operates it as a cell-search wireless interface (CWI) and sets the wireless interface 30B in a state termed as an inactive wireless interface (IWI).

At step 102, the diversity controller 17 performs a cell search using the wireless interface 30A and monitors the output of field strength detector 14A for detecting a base station (step 103). If the output of field strength detector 14A indicates a base station is detected, the diversity controller 17 checks to see if the output of sync detector indicates that the mobile terminal is synchronized to the base station (step 104). If the decision at step 104 is negative, flow returns to step 102 to continue the cell search.

If the mobile terminal is synchronized to the detected base station, flow proceeds from step 104 to step 105 to set the cell-search wireless interface (CWI) in a session wireless interface (SWI) to begin a session with a remote data terminal.

If the mobile terminal is moving at high speed, cell-search operation must be performed continuously using the other wireless interface to hand over the session to a new base station so that continuity of data transmission is ensured. This requires two wireless interfaces to be simultaneously activated on a continued basis. However, the continued use of the two wireless interfaces would result in a rapid loss of battery power or require a heavy, high capacity battery. In order to operate the two wireless interfaces in a battery-saving mode, the diversity controller 17 activates the inactive wireless interface at an appropriate timing to perform a cell-search operation.

In a first embodiment, the diversity controller 17 compares the output of the field strength detector 15 of the session wireless interface to a threshold value at step 106 and determines if the detected field strength is lower than the threshold value (step 107). If the detected field strength is higher than the threshold value, flow returns to step 106 to repeat the comparison.

If the detected field strength is lower than the threshold value, it is determined that a handover is imminent and flow proceeds from step 107 to step 108 to set the inactive wireless interface (IWI) in a cell-search mode (CWI). Therefore, the wireless interface 30B, which was initially set in an inactive mode, is activated. At step 109, the diversity controller 17 sets the wireless interface 30B to initiate a cell search for a new base station, while the wireless interface 30A is continuing the session, and determines if a new base station is detected (step 110).

If a new base station is detected, flow proceeds from step 110 to step 111 to monitor the output of the sync detector 16B to determine if the mobile terminal is synchronized to the new base station. If not, steps 109 to 111 are repeated. If the mobile terminal is synchronized to the new base station, the diversity controller 17 proceeds to step 112 to set the session-mode wireless interface (i.e., 30A) in an inactive state (IWI) and set the cell-search mode wireless interface (i.e., 30B) in a session-mode wireless interface (SWI), and returns to step 106.

Therefore, the session is handed over from the old base station to the new base station. It is seen that the two wireless interfaces 30A and 30B are simultaneously set in a power-ON state only for a brief interval of time that is necessary to perform a handover. As the session proceeds with the new base station, steps 106 and 107 are repeated on the output of the field strength detector 15B. If the field strength drops below the threshold, steps 108 to 112 will be executed to hand over the session to a further new base station using the wireless interface 30A.

In a second embodiment, shown in FIG. 3, the diversity controller 17 checks the output of the field strength detector 15 of the session wireless interface at periodic intervals and stores the detected field strength values in memory, and determines from the stored strength values the timing at which the field strength will drop below the threshold.

Specifically, following step 105, the diversity controller 17 sets a variable "i" equal to 1 (step 201) and monitors a timer and determines whether the timer has reached a check timing (step 202). If so, flow proceeds to step 203 to detect the field strength by storing the output of the field strength detector 15 of the initially activated wireless interface. This field strength check is repeated until the variable "i" equals a predetermined value "m" (step 204) by incrementing the variable "i" (step 206).

When the field strength check is repeated m times, the diversity controller 17 proceeds from step 204 to step 206 to use the stored field strength values to estimate the timing at which the field strength will drop below a predetermined threshold value.

Figure 4A:
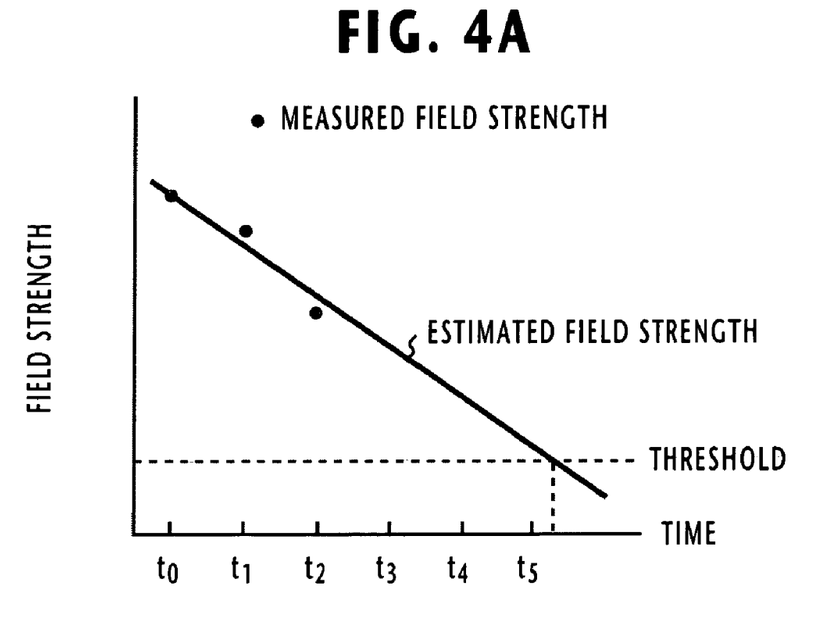
FIGS. 4A and 4B are graphic illustrations for describing the operation of the second embodiment.
Figure 4B:
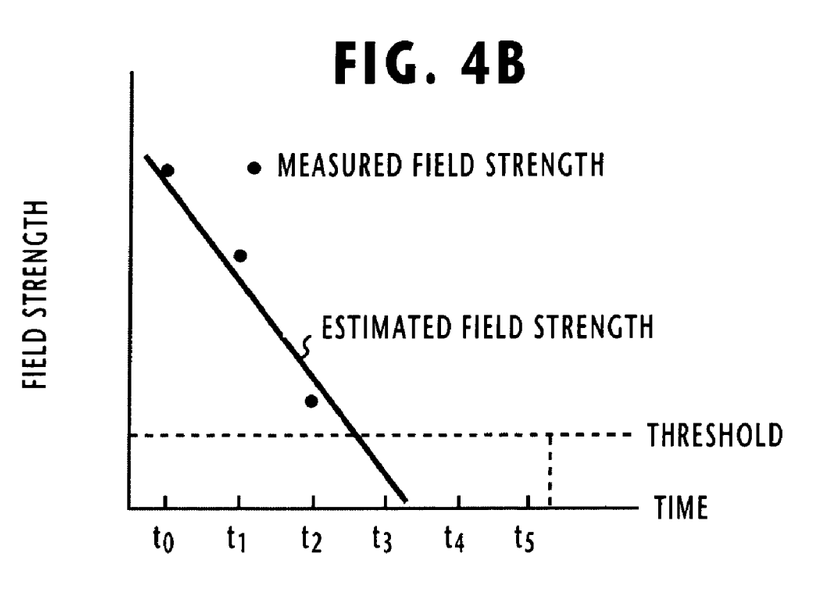

As illustrated in FIG. 4A, if the stored field strength values at times $t_0$, $t_1$ and $t_2$ show a tendency that they are decaying with time and their rate of decay is low, the diversity controller determines that the field strength will drop below the threshold immediately after time $t_5$. If the field strength values stored at times $t_0$, $t_1$, and $t_2$ show that they are decaying rapidly as illustrated in FIG. 4B, the diversity controller determines that the field strength will drop below the threshold within the interval between times $t_2$ and $t_3$.

At step 207, the diversity controller 17 compares the estimated timing to the next check timing. If the estimated timing is greater than the next check timing, it is determined that the field strength will not drop below the threshold at the next check timing and flow returns to step 201. If the estimated timing is nearer than the next check timing, it is determined that the field strength will drop below the threshold at the next check timing and flow proceeds to step 108.

Figure 5:
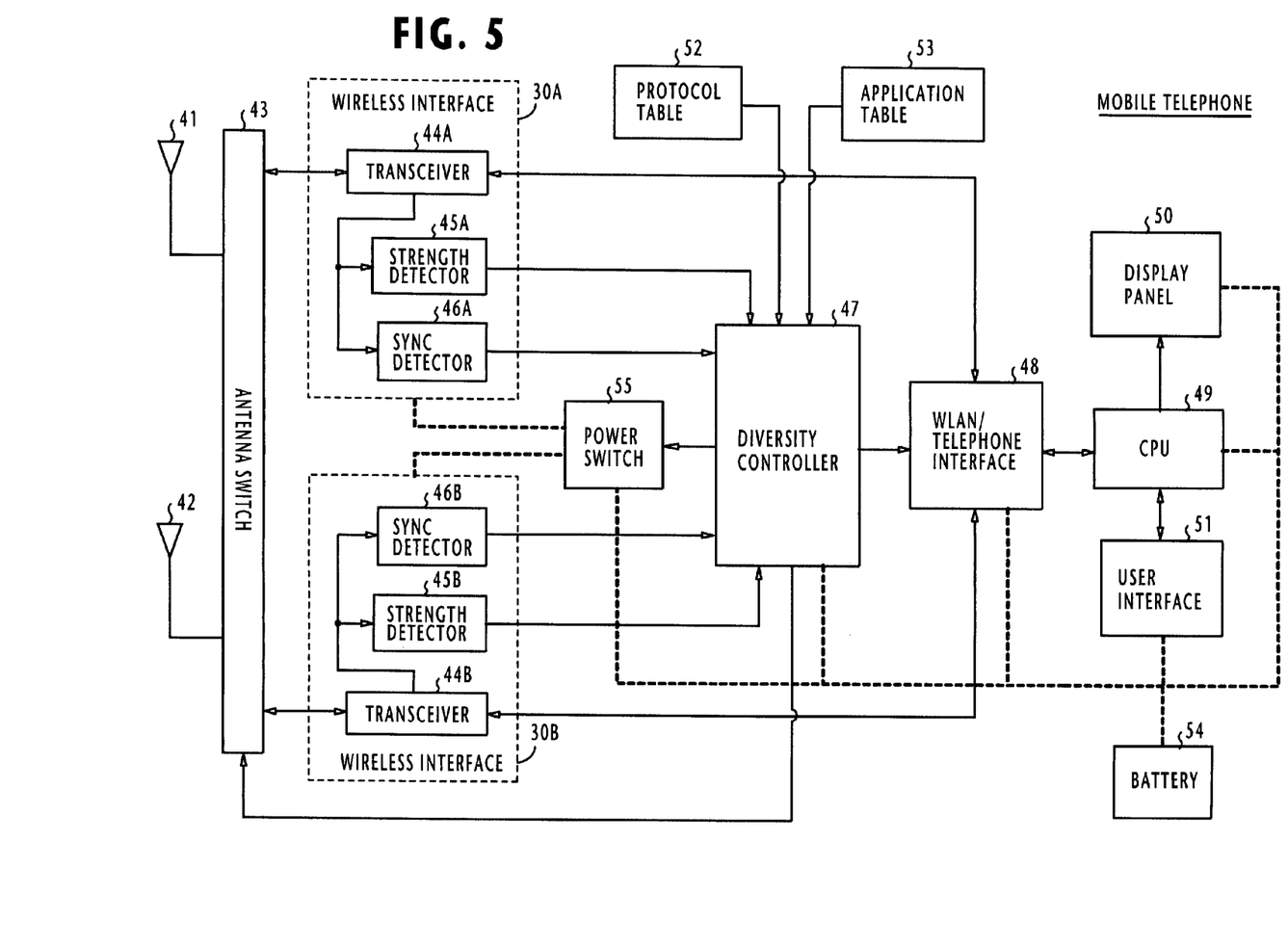
FIG. 5 is a block diagram of a power saving diversity mode mobile telephone of the present invention.

The present invention as described above can be equally used in a mobile telephone provided with wireless LAN functionality as shown in FIG. 5.

The mobile telephone has a pair of antennas 41 and 42 connected to an antenna switch 43 that selectively establishes a connection to wireless interfaces 30A and 30B under the control of a diversity controller 47, to which a wireless LAN/telephone interface 48 is connected. Similar to FIG. 1, each of the wireless interfaces 30A, 30B comprises a wireless transceiver 44, a field strength detector 45 and a sync detector 46.

Diversity controller 47 initially sets one of the wireless interfaces 30A and 30B in a power-ON state by supplying a DC voltage through a power switch 55 from a rechargeable battery 54 and establishes a connection to a base station. Once a connection is established, the diversity controller 47 directs the wireless LAN/telephone interface 48 to begin a session with a remote data terminal using the active wireless transceiver 44. WLAN/telephone interface 48 is connected to a CPU 49 which is, in turn, connected to a display panel 50 and a user interface 51 such as a keypad and a microphone and a speaker. Mobile telephone further includes a protocol table 52 for storing the identification codes of a plurality of protocols that require that no interruption should occur during a session. An application table 53 is further provided for storing the identification codes of a plurality of application programs that require that no interruption should occur during a call. All circuit elements of the mobile telephone are connected through power lines to the rechargeable battery 54.

Diversity controller 47 is capable of reading the identity of a protocol from the header of an IP packet and comparing the identity of the protocol to the identification codes of the protocols stored in the protocol table 52. If the protocol used in a session is the RTP (Real-time Transport Protocol), for example, it is necessary to avoid interruption when the mobile telephone is roaming.

Diversity controller 47 is further capable of detecting the identity of an application program being used and comparing the identity of the application program to the identification codes stored in the application table 53. If the application being used is the VoIP (Voice over IP), it is necessary to avoid interruption when the mobile telephone is roaming.

While the session proceeds, the diversity controller 47 monitors the output of the field strength detector 45 of the active wireless interface and determines whether or not a cell search is required for a handover to a new base station so that continuity is guaranteed for the session. If this is the case, the diversity controller sets the other wireless interface in a power-ON state and initiates a search for a new base station so that both wireless interfaces operate simultaneously for a brief period of time while the session with the old base station is nearing its end.

Figure 3:
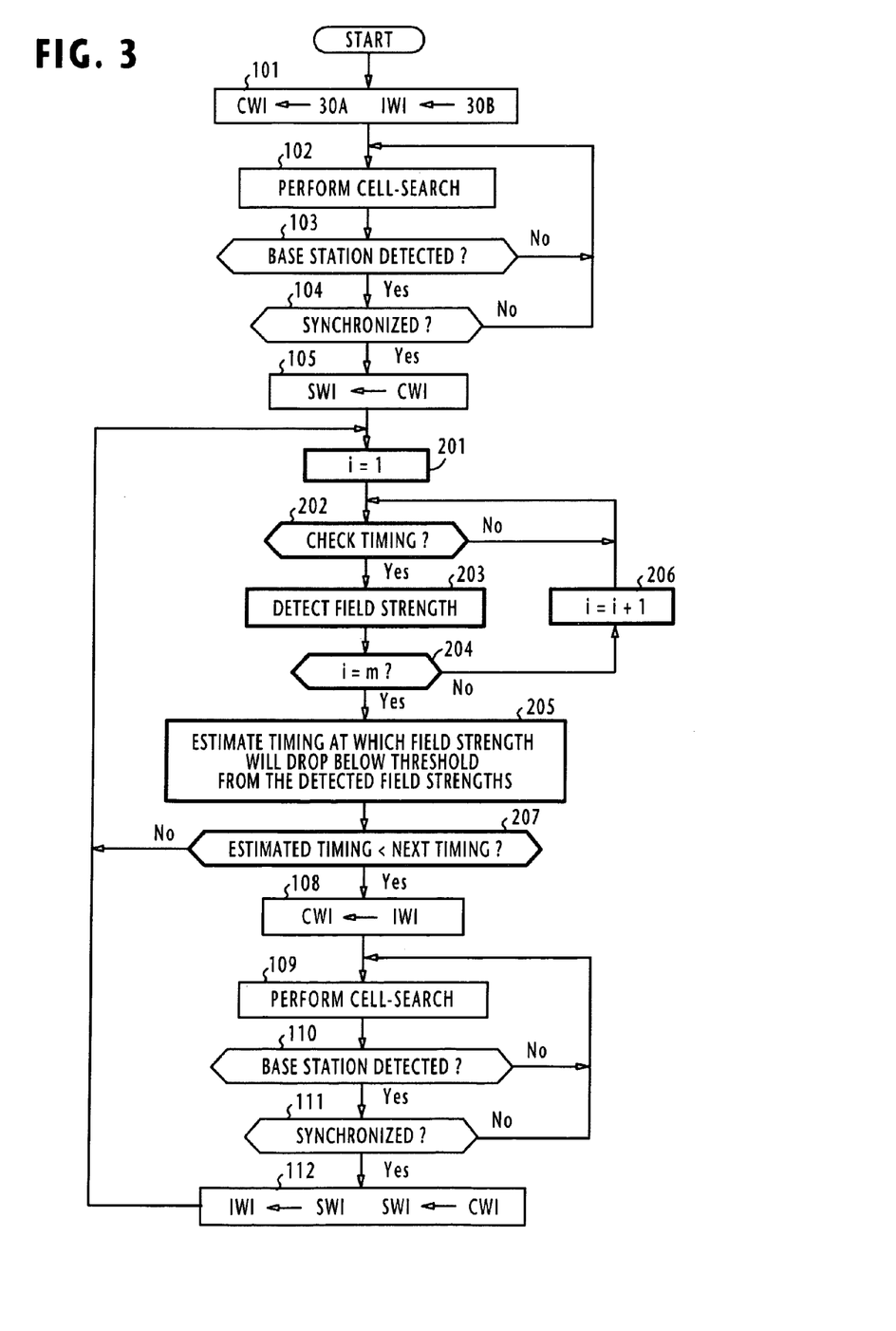
FIG. 3 is a flowchart of the operation of the diversity controller of FIG. 1 according to a second embodiment of the invention.

Diversity controller 47 operates in the same manner to the diversity controller of FIG. 1 with reference to the flowcharts of FIGS. 2 and 3. In addition, the diversity controller 47 operates according to the flowcharts of FIGS. 6 and 7.

Figure 6:
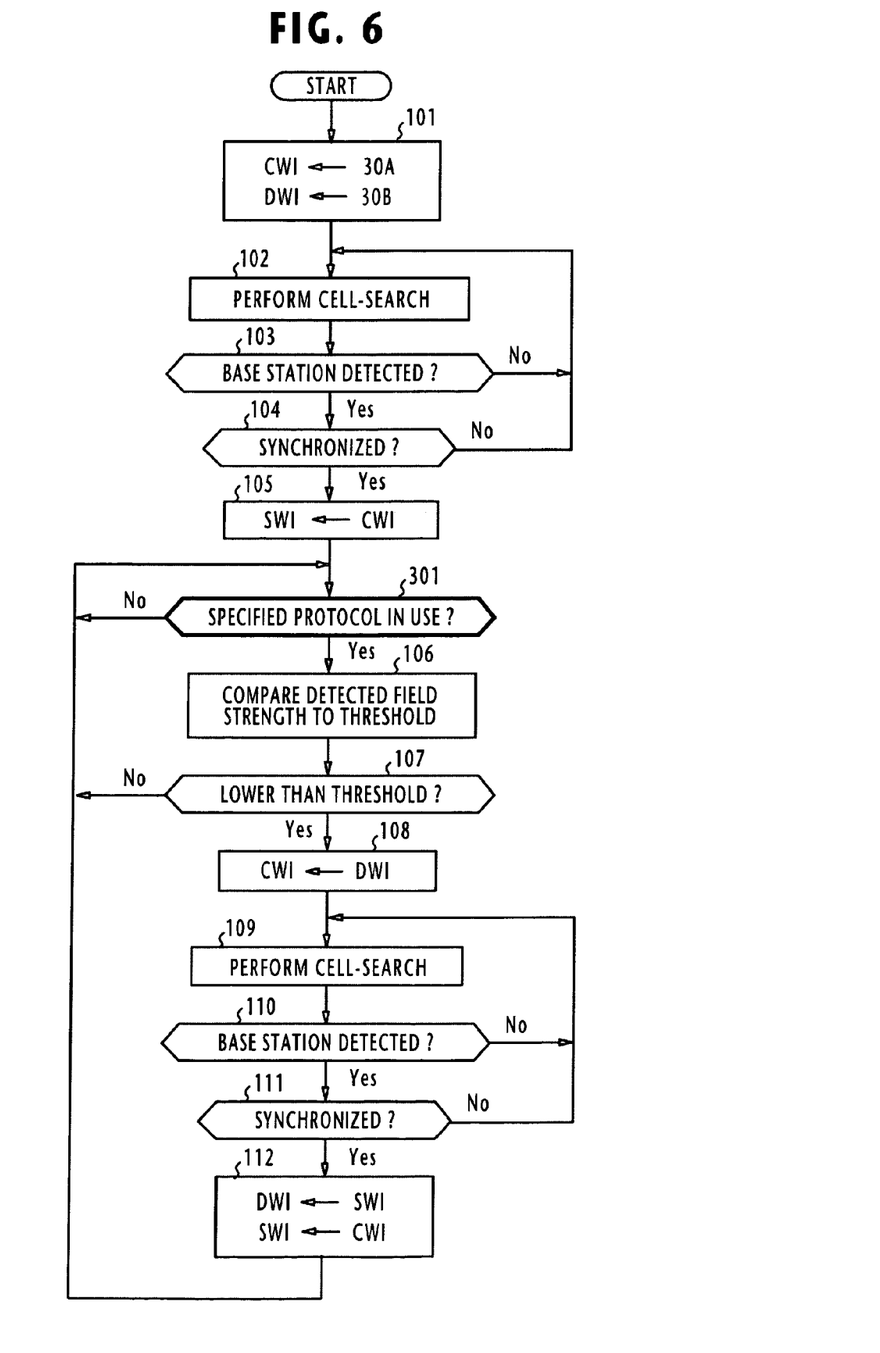
FIG. 6 is a flowchart of the operation of the diversity controller of FIG. 5 according to a third embodiment of the invention.

In FIG. 6, steps corresponding to those of FIG. 2 are marked with the same reference numerals and the description thereof is omitted. FIG. 6 differs from the FIG. 2 flowchart by the inclusion of step 301 in which the diversity controller 47 compares the identity of the protocol of the current session to those of the protocol table 52 which require that no interruption should occur when a session is proceeding. If the identity of the current protocol corresponds to one of the identities stored in the protocol table 52, such as the RTP protocol, the decision at step 301 is affirmative and flow proceeds to step 106 to compare the output of field strength detector 45 of the active wireless interface to the threshold. Depending on the result of comparison at step 107, steps 108 to 112 are executed in the same manner as described in connection with FIG. 2.

Figure 7:
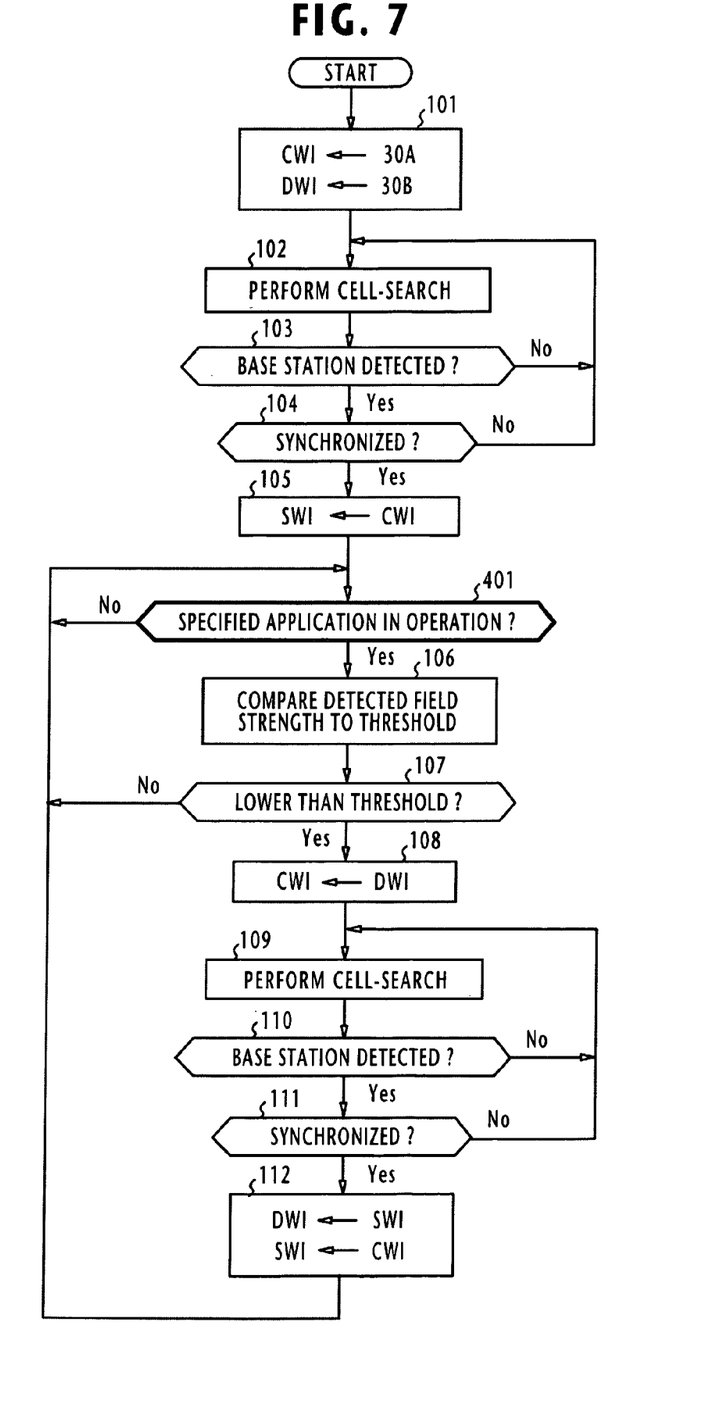
FIG. 7 is a flowchart of the operation of the diversity controller of FIG. 5 according to a fourth embodiment of the invention.

FIG. 7 differs from the FIG. 6 flowchart in that step 301 is replaced with step 401 in which the diversity controller 47 compares the identity of the application program currently in use to those of the application table 53 which require that no interruption should occur when a call is in progress. If the identity of the current application corresponds to one of the identities stored in the application table 53, such as the VoIP protocol, the decision at step 401 is affirmative and flow proceeds to step 106 to compare the output of field strength detector 45 of the active wireless interface to the threshold. Depending on the result of comparison at step 107, steps 108 to 112 are executed in the same manner as described in connection with FIG. 2.

It is seen that, instead of steps 106 and 107, steps 201 to 204 can equally be used in FIGS. 6 and 7.

What is claimed is:

1. A wireless mobile communication device comprising:
a battery;
at least one antenna;
first and second wireless interfaces operable with said at least one antenna, said first and second wireless interfaces being arranged to be individually powered from said battery; and
a controller for setting said first wireless interface in a power-ON state for establishing a first wireless link with a first base station,
wherein said controller is arranged to detect field strengths of the first wireless interface at successive intervals, estimate, from said detected field strengths, timing at which subsequent field strength of said first wireless interface will drop below a threshold value, compare the estimated timing to next timing at which the field strength of the first wireless interface will be detected, and make a determination that a handover is necessary if said estimated timing is nearer than said next timing,
said controller is further arranged to set the second wireless interface in a power-ON state to perform a cell search in response to the determination that a handover is necessary, establish a second wireless link with a second base station when the same is detected by the cell search, and set the first wireless interface in a power-OFF state at the instant said second wireless link is established.

2. A wireless mobile communication device comprising:
a battery;
at least one antenna;
first and second wireless interfaces operable with said at least one antenna, said first and second wireless interfaces being arranged to be individually powered from said battery;
a memory for storing at least one protocol identity; and
a controller for setting said first wireless interface in a power-ON state for establishing a first wireless link with a first base station, wherein said controller is arranged to compare a protocol identity contained in an IP packet to said protocol identity stored in said memory, if the protocol identity of the IP packet coincides with the stored protocol identity, detecting field strengths of the first wireless interface at successive intervals, estimate, from said detected field strengths, timing at which subsequent field strength of said first wireless interface will drop below a threshold value;

compare the estimated timing to next timing at which the field strength of the first wireless interface will be detected, if said estimated timing is nearer than said next timing, set the second wireless interface in a power-ON state and perform a cell search, establish a second wireless link with a second base station when the same is detected by the cell search and set the first wireless interface in a power-OFF state at the instant said second wireless link is established.

3. The wireless mobile communication device of claim 2, wherein said protocol of said at least one protocol identity is Real-time Transport Protocol.

4. The wireless mobile communication device of claim 3, wherein said application program of said at least one identity is Voice over IP protocol.

5. The wireless mobile communication device of claim 4, wherein said wireless mobile communication device is a mobile telephone.

6. A wireless mobile communication device comprising:
a battery;
at least one antenna;
first and second wireless interfaces operable with said at least one antenna, said first and second wireless interfaces being arranged to be individually powered from said battery;
a memory for storing at least one application program identity; and
a controller for setting said first wireless interface in a power-ON state for establishing a first wireless link with a first base station,
wherein said controller is arranged to compare an identity of an application program currently in use to said application program identity stored in said memory;
if the identity of the current application program coincides with the stored application program identity, detect field strengths of the first wireless interface at successive intervals,
estimate, from said detected field strengths, timing at which subsequent field strength of said first wireless interface will drop below a threshold value,
compare the estimated timing to next timing at which the field strength of the first wireless interface will be detected, and
determine that a handover is necessary if said estimated timing is nearer than said next timing,
wherein said controller is further arranged to set the second wireless interface in a power-ON state in response to the determination that a handover is necessary to perform a cell search, establish a second wireless link with a second base station when the same is detected by the cell search, and set the first wireless interface in a power-OFF state at the instant said second wireless link is established.

7. A battery saving method for a wireless mobile communication device, wherein the device comprises a battery, at least one antenna, first and second wireless interfaces operable with said at least one antenna wherein said first and second wireless interfaces are arranged to be individually powered from said battery, the method comprising the steps of:

a) setting said first wireless interface in a power-ON state for establishing a first wireless link with a first base station;

b) detecting field strengths of the first wireless interface at successive intervals and estimating, from the detected field strengths, timing at which subsequent field strength of said first wireless interface will drop below a threshold value, comparing the estimated timing to next timing at which the field strength of the first wireless interface will be detected, and make a determination that a handover is necessary if said estimated timing is nearer than said next timing;

c) setting said second wireless interface in a power-ON state in response to the determination that said handover is necessary and making a cell search establishing a second wireless link with a second base station when the same is detected by the cell search; and d) setting the first wireless interface in a power-OFF state at the instant said second wireless link is established.

8. The battery saving method of claim 7, further comprising the steps of:

e) making a determination whether a handover is necessary from said second base station to a third base station;

f) setting said first wireless interface in a power-ON state in response to the determination that said handover is necessary and making a search for said third base station; and g) setting the second wireless interface in a power-OFF state when said first wireless interface has established a third wireless link with said third base station.

9. A battery saving method for a wireless mobile communication device, wherein said wireless mobile communication device comprises a battery, at least one antenna, first and second wireless interfaces operable with said at least one antenna, a memory for storing at least one protocol identity, wherein the method comprises the steps of:

a) setting said first wireless interface in a power-ON state for establishing a first wireless link with a first base station;

b) comparing a protocol identity contained in an IP packet to said protocol identity stored in said memory, if the protocol identity of the IP packet coincides with the stored protocol identity, detecting field strengths of the first wireless interface at successive intervals, estimating, from said detected field strengths, timing at which subsequent field strength of said first wireless interface will drop below a threshold value, comparing the estimated timing to next timing at which the field strength of the first wireless interface will be detected, and making a determination that a handover is necessary if said estimated timing is nearer than the next timing;

c) setting said second wireless interface in a power-ON state in response to said determination that said handover is necessary and making a cell search establishing a second wireless link with a second base station when the same is detected by the cell search; and d) setting the first wireless interface in a power-OFF state at the instant said second wireless link is established.

10. The battery saving method of claim 9, wherein said protocol of said at least one protocol identity is Real-time Transport Protocol.

11. A battery saving method for a wireless mobile communication device, wherein said wireless mobile communication device comprises a battery, at least one antenna, first and second wireless interfaces operable with said at least one antenna, a memory for storing at least one protocol identity, wherein the method comprises the steps of:

a) setting said first wireless interface in a power-ON state for establishing a first wireless link with a first base station;

b) comparing an identity of an application program currently in use to said application program identity stored in said memory, if the identity of the current application program coincides with the stored application program identity, detecting held strengths of the first wireless interface at successive intervals, estimating, from said detected field strengths, timing at which subsequent field strength of said first wireless interface will drop below a threshold value, comparing the estimated timing to next timing at which the field strength of the first wireless interface will be detected, and making a determination that a handover is necessary if said estimated timing is nearer than the next timing;

c) setting said second wireless interface in a power-ON state in response to said determination that said handover is necessary and making a cell search establishing a second wireless link with a second base station when the same is detected by the cell search; and d) setting the first wireless interface in a power-OFF state at the instant said second wireless link is established.

12. The battery saving method of claim 11, wherein said application program of said at least one identity is Voice over IP protocol.

* * * * *